Oct. 11, 1960     J. A. COTA     2,955,667
HYDRAULIC POWER STEERING MECHANISM WITH DAMPING MEANS
Filed Sept. 4, 1957     2 Sheets-Sheet 2

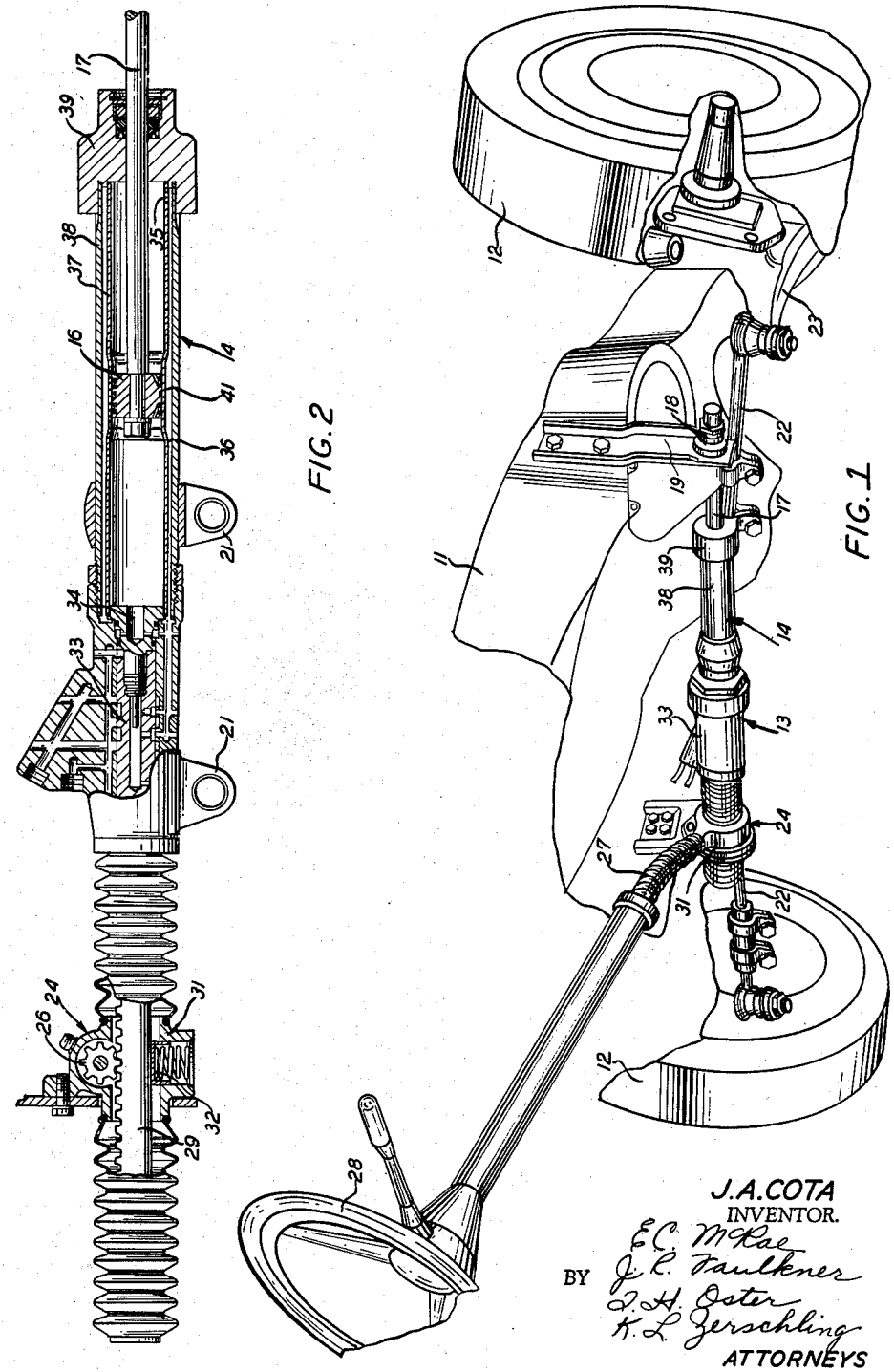
J.A. COTA
INVENTOR.
ATTORNEYS

J. A. COTA
INVENTOR.

BY *E. C. McRae*
*J. R. Faulkner*
*J. H. Oster*
*H. L. Zerschling*
ATTORNEYS

United States Patent Office
2,955,667
Patented Oct. 11, 1960

2,955,667

HYDRAULIC POWER STEERING MECHANISM WITH DAMPING MEANS

John A. Cota, Dearborn, Mich., assignor to Ford Motor Company, Dearborn, Mich., a corporation of Delaware Filed Sept. 4, 1957, Ser. No. 682,044

4 Claims. (Cl. 180—79.2)

This invention relates generally to a power steering mechanism for motor vehicles, and particularly to a power steering mechanism incorporating means for damping vibrations.

In the usual worm type steering mechanism, the worm gear unit is irreversible or at least semi-irreversible, and consequently is effective to dampen vibrations originating at the road wheels so that the vibrations will not be transmitted to the vehicle and particularly to the steering wheel. In other types of steering mechanisms, however, such as the type utilizing a rack and pinion gear unit, the mechanism does not have irreversible characteristics, and consequently road vibrations are more readily transmitted to the steering wheel. It is, therefore, an object of the present invention to incorporate in a steering mechanism means damping these vibrations.

A further object of the invention is to provide a hydraulic power steering mechanism effectively damping vibrations during a power steering stroke yet relieving the damping action during the recovery stroke of the steering mechanism so as not to interfere with a smooth and rapid recovery from a turn to straight-ahead driving.

Still another object of the invention is to provide a hydraulic power steering mechanism affording damping characteristics during straight-ahead driving without increasing the resistance to turning movements in either direction.

Another object of the invention is to provide a hydraulic power steering mechanism incorporating frictional damping which is actuated hydraulically by the line pressure in the steering system so that the damping will be more effective during power steering movements than during return or recovery movements.

Other objects and advantages of the invention will be more apparent as this description proceeds, particularly when considered in connection with the accompanying drawings in which:

Figure 1 is a fragmentary perspective view of a power steering mechanism incorporating the present invention.

Figure 2 is a transverse cross sectional view through the power steering mechanism shown in Figure 1.

Figure 3:
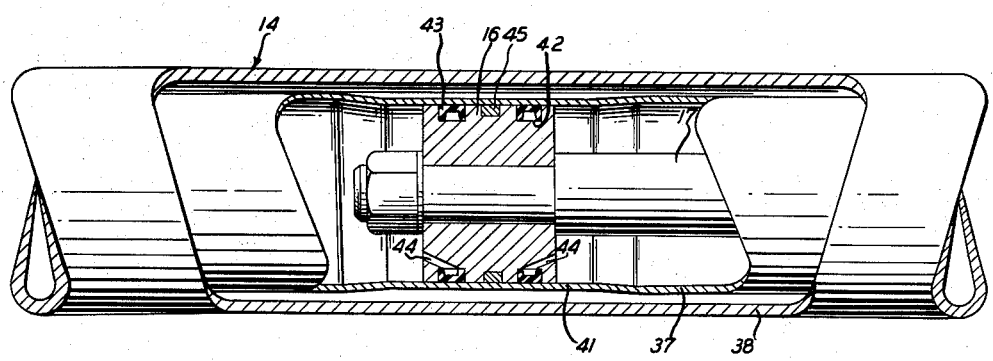
Figure 3 is an enlarged cross sectional view through a portion of the construction shown in Figure 2.

Referring now to the drawings, and particularly to Figures 1, 2 and 3, the reference character 11 indicates a vehicle frame having front road wheels 12 conventionally supported thereon. The road wheels 12 are adapted to be steered by means of a power steering mechanism 13 including a hydraulic cylinder 14 and a piston 16 reciprocable thereon. The piston 16 is mounted at one end of a connecting rod 17 which in turn is anchored by means of rubber mounts 18 to a frame bracket 19.

Flanges 21 are carried by the cylinder 14 and are connected to oppositely extending tie rods 22 which in turn are connected to steering arms 23 to conventionally steer the vehicle in accordance with transverse movement of the power steering cylinder 14.

Various types of actuating mechanism may be employed, but in the present instance there is shown a rack and pinion type steering gear 24 incorporating a pinion 26 connected by means of a flexible cable drive 27 to a steering wheel 28. The pinion engages a rack 29 extending through the gear housing 31. A spring biased friction member 32 is carried by the housing and engages the rack to take up play between the rack and pinion.

The rack 29 is connected to conventional power steering valve mechanism 33 carried at one end of the cylinder 14. Manual movement of the rack 29 by actuation of the steering wheel is effective through the valve 33 to direct fluid pressure from a suitable source (not shown) to one end or the other of the power steering cylinder 14. In the present instance, fluid is supplied through the passage 34 to the near end of the cylinder, while the end of the cylinder on the opposite side of the piston 16 is supplied through a port 35 and an annular passageway 36 formed between the inner and outer cylinders 37 and 38 respectively which, in the present construction, form the power steering cylinder 14. An end cap 39 closes the end of the cylinder, and provides a bearing for the piston rod 17.

The rack and pinion steering gear does not possess the characteristics of irreversibility, and consequently is not effective to dampen vibrations originating in the road wheels. As seen in Figures 2 and 3, however, means are incorporated in the power steering cylinder to accomplish the desired damping and to prevent the transmission of such vibrations from the road wheels to the steering wheel.

In Figure 3 the piston 16 is shown in the position it occupies during normal straight-ahead driving. It will be noted that in this position the piston is centered within a reduced diameter portion 41 of the inner cylinder 37. For the purposes of illustration, this reduced portion of the cylinder is exaggerated, and in actual construction the difference in diameter between the central reduced portion 41 of the cylinder and the remainder of the cylinder would only be a few thousandths of an inch. This reduction, however, is sufficient to provide additional frictional resistance between the cylinder and the piston during normal straight-ahead driving, and is thus effective to dampen vibrations. It will be noted that the reduced portion of the cylinder extends a short distance on each side of the central position of the piston so that minor corrective steering may be effective within the reduced portion of the cylinder. Steering movements of greater amplitude, however, will move the piston beyond the reduced portion 41 and will consequently decrease the frictional resistance between the cylinder and the piston, and will not interfere with the relative movement between the piston and cylinder during steering movements.

It will be noted that the piston 16 is formed with a pair of axially spaced annular grooves 42 on its periphery adapted to receive resilient rings 43. The rings 43 are channel shaped in cross section, and their inner surfaces are placed in communication with the interior of the cylinder 37 on opposite sides of the piston 16 by means of passageway 44. A centrally located piston ring 45 is carried by the piston 16 between the resilient rings 43.

It will be apparent that the fluid pressure within the cylinder is thus transmitted to the resilient rings 43 to increase the pressure of the rings against the cylinder walls, thus increasing the frictional resistance. During straight-ahead driving, however, the pressure in the cylinder is low, perhaps in the order of 50 p.s.i., and this is insufficient to produce adequate friction damping through the resilient rings 43. At this time, however, the piston and the friction rings are within the central reduced portion 41 of the cylinder, and adequate damping is provided. During turns the piston moves beyond the central reduced portion 41 of the cylinder, but at this time the pressure in the cylinder on the pressure side of the piston 16 is increased. This pressure may be in the order of 200 to 300 p.s.i., and is sufficient to provide the necessary friction damping through the adjacent resilient ring 43. During the recovery stroke, however, when the cylinder is being returned to its straight-ahead position, the pressure in the cylinder drops, and the friction between the resilient ring 43 and the cylinder is reduced so that the return movement is not impaired. Thus it will be seen that the combination of the reduced central portion 41 of the cylinder and the fluid pressure actuated rings 43 carried by the piston effectively provide damping when required without providing unnecessary frictional resistance to the recovery stroke of the power steering mechanism.

Figure 4:
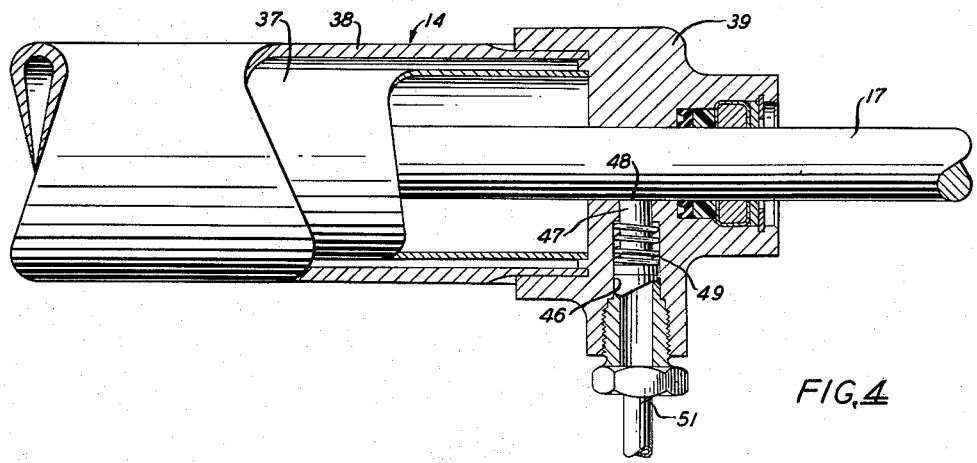
Figures 4 and 5 are enlarged cross sectional views through modifications.

Figure 4 illustrates a modification which applies frictional resistance directly to the piston rod 17 to dampen vibrations. In this modification, the end cap 39 of the cylinder assembly 14 is provided with a stepped bore 46 extending radially with respect to the piston rod 17. A friction plunger 47 is received within the bore 46, and has an end face 48 adapted to frictionally engage the periphery of the piston rod 17. A coil spring 49 urges the friction plunger 47 in a direction away from the piston rod 17.

A conduit 51 provides communication from the high pressure line of the power steering system to subject the head of the friction plunger 47 to the fluid pressure in the system. During a turn, the line pressure is sufficient to overcome the spring 49, and to urge the friction plunger 47 into friction engagement with the piston rod 17 to provide friction damping. The line pressure is reduced, however, during the recovery stroke of the steering mechanism, and the spring 49 is selected of such strength to be capable of overcoming the reduced line pressure at this time so that the friction plunger 47 will be moved away from the piston rod 17. Consequently, the friction damping is removed during the recovery stroke so that the return movement of the mechanism will not be impaired.

Figure 5:
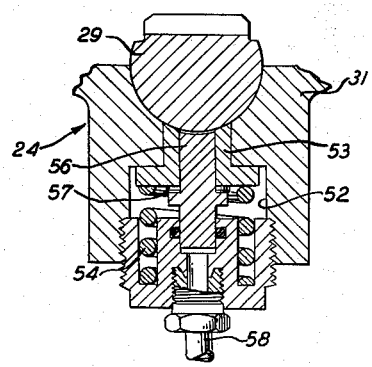

Figure 5 illustrates a somewhat similar modification as applied to the rack and pinion steering gear 24. In this construction, the housing 31 of the steering gear is formed with a stepped bore 52 receiving a hollow friction plunger 53 urged by a spring 54 into frictional engagement with the lower surface of the rack 29. This plunger functions in the manner of the friction member 32 shown in Figure 2 to take up play between the rack and pinion.

Additional frictional resistance may be provided, however, by means of a central plunger 56 normally urged out of frictional engagement with the lower surface of the rack by means of a spring 57. This spring is, however, adapted to be overcome by line pressure introduced through a conduit 58 during steering movements to apply additional frictional resistance to the rack 29 to dampen vibrations. As in the modification shown in Figure 4, the reduced line pressure during recovery strokes is insufficient to overcome the spring 57, and the frictional engagement of the plunger 56 is thus removed at this time.

It will be understood that the invention is not to be limited to the exact construction shown and described, but that various changes and modifications may be made without departing from the spirit and scope of the invention, as defined in the appended claims.

What is claimed is:

1. Power steering mechanism for a motor vehicle comprising a cylinder member, a piston member reciprocable within said cylinder member, resilient sealing means carried by said piston member and frictionally engaging said cylinder member to form a fluid seal therebetween, means connecting one of said members to the frame of the vehicle, means connecting the other of said members to the steerable road wheels of the vehicle to steer the latter, said cylinder member having a portion reduced in diameter with respect to the other portions of said cylinder member to increase the frictional engagement between said resilient sealing means and said cylinder member when the latter is in this portion of the cylinder to frictionally dampen vibrations in the power steering mechanism.

2. The structure defined by claim 1 which is further characterized in that said reduced portion of said cylinder member is so located as to be in alignment with said piston member when the road wheels of the vehicle are in straight-ahead position.

3. The structure defined by claim 1 which is further characterized in that said piston member is formed with a pair of axially spaced annular grooves on its periphery, said resilient means comprising resilient rings seated within said grooves, and passages establishing fluid communication between each of said grooves and the interior of the cylinder member at the adjacent side of said piston to apply the fluid pressure within the cylinder directly to said resilient rings.

4. Power steering mechanism for the steerable road wheels of a motor vehicle comprising, a power cylinder member, a piston member reciprocable within said cylinder member, means connecting one of said members to the frame of the vehicle, means connecting the other of said members to said steerable road wheels, a reduced diameter portion in said cylinder member so located as to encircle said piston member when the road wheels of the vehicle are in straight-ahead position, an expandable friction member peripherally encircling said piston so as to firmly contact said reduced portion to provide substantial resistance to relative movement of said cylinder and piston, but to move with relative freedom through the larger diameter portions of said cylinder, and means for hydraulically expanding said friction member by the application of hydraulic pressure generated in said cylinder during power steering.

References Cited in the file of this patent

UNITED STATES PATENTS

| | | |
|---|---|---|
| 751,575 | Veeder | Feb. 9, 1904 |
| 1,958,810 | Berg | May 15, 1934 |
| 2,047,059 | Clark | July 7, 1936 |
| 2,755,779 | Muller | July 24, 1956 |
| 2,755,876 | Muller | July 24, 1956 |

FOREIGN PATENTS

| | | |
|---|---|---|
| 707,962 | Great Britain | Apr. 28, 1954 |